United States Patent Office 3,558,449
Patented Jan. 26, 1971

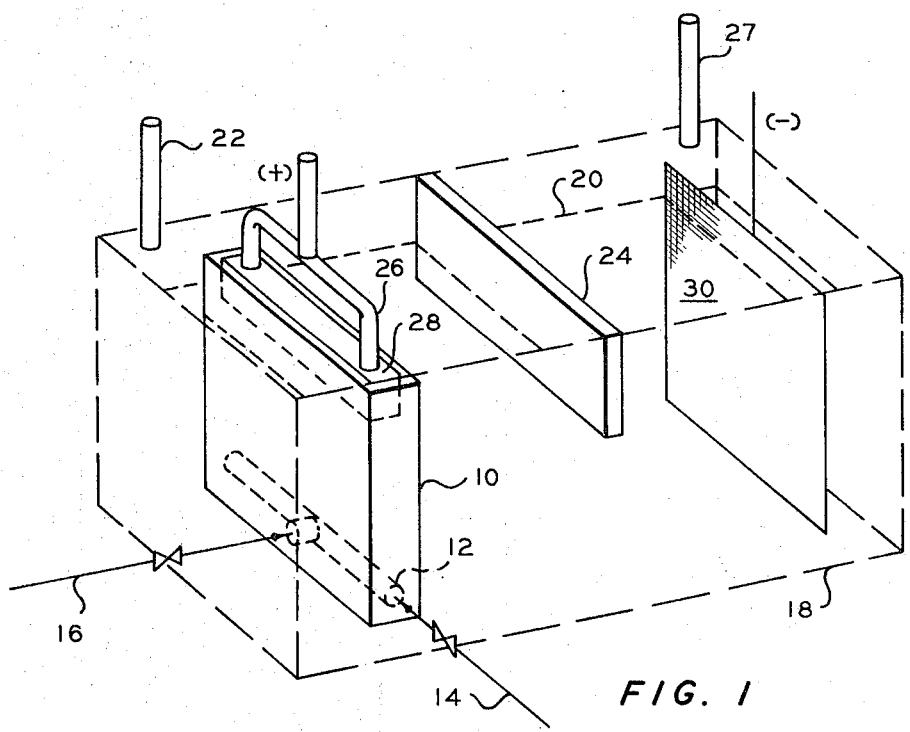
FIG. 1
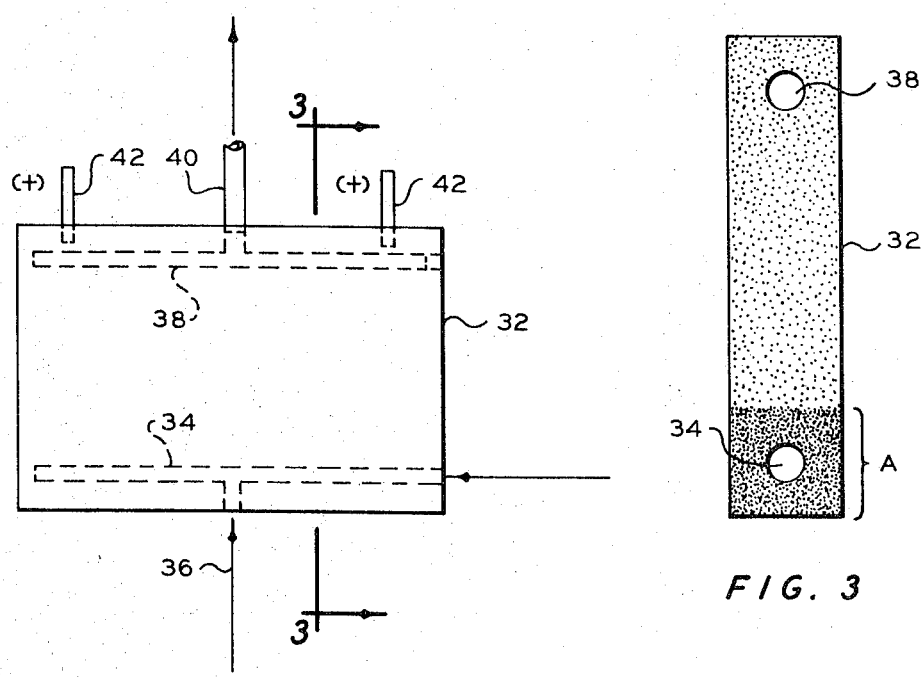
FIG. 2
FIG. 3
INVENTOR.
W. V. CHILDS
ATTORNEYS

3,558,449
PROCESS FOR ELECTROCHEMICAL
FLUORINATION
William V. Childs, Bartlesville, Okla., assignor to Phillips
Petroleum Company, a corporation of Delaware
Filed June 24, 1968, Ser. No. 739,509
Int. Cl. B01k 3/00
U.S. Cl. 204—59        4 Claims

ABSTRACT OF THE DISCLOSURE

In an electrochemical fluorination process wherein the reaction takes place within the confines of a porous electrode element, the lower portion of this element is impregnated with a surfactant having a fluorocarbon radical having a terminal $-CF_3$ group

BACKGROUND OF THE INVENTION

This invention relates to porous electrode elements and processes for electrochemical conversions utilizing an HF-containing electrolyte.

Porous electrode elements, particularly porous carbon anodes are widely used in electrochemical conversion reactions. Generally, the utilization of such elements has involved immersing the element in an electrolyte and passing an electric current through this electrolyte from this element to an oppositely charged element. At least a portion of materials within the electrolyte is converted into products at one or both electrodes. In a variation on this process, an additional feedstock for the conversion process is bubbled into the electrolyte through a porous electrode element, such as a porous carbon anode, to form still different products.

Very recently it has been discovered that the reaction in an electrochemical conversion operation can be carried out within the confines of the porous electrode element itself. This type of operation is of particular utility in electrochemical fluorination because it makes possible a simple one-step route to partially fluorinated products which had previously been difficult to obtain. Carrying out the fluorination reaction within the porous anode, in addition to making possible the direct production of partially fluorinated product, also allows operation at high rates of conversion, and without the formation of substantial amounts of cleavage products generally produced by the older methods when operating at high conversion rates.

The feed to be fluorinated is introduced into the porous anode at a point near its bottom and the fluorinated mixture exists at the top of the anode, generally above the electrolyte level. Passage of the feed into the bulk of the electrolyte is avoided.

It is apparent that if the reaction is to take place within the electrode element, larger electrodes are desirable in order to increase the available surface area wherein the reaction takes place. However, with larger electrodes, it has been found that an uneven distribution of feed material can occur within the electrode with the result—for instance in fluorination reaction using a $KF \cdot 2HF$ electrolyte—that in portions of the electrode farthest from the feed entry port, there is developed an excess of fluorination species and a deficiency of feed to be fluorinated. This produces several unsatisfactory results among which is the production of high amounts of perfluoro materials which seriously reduces the advantage of this system for the production of partially fluorinated product.

It would appear that, by drilling feed distribution cavities such as lateral passages through the bottom of the electrode element, even distribution of the feed could be obtained. Thus, the advantages of carrying out the reaction within the electrode, namely, production of moderately fluorinated products and operation at high conversion rates without production of significant amounts of cleavage products, could be obtained in an electrode which was relatively wide and of sufficient size to be employed in a commercial scale operation. However, when attempts were made to increase the size of the electrodes still more by making them longer for deeper immersion, it was found that electrode elements having such feed distribution cavities tended, after a time, to undergo invasion with electrolyte which interfered with the feed distribution and ultimately resulted in plugging of the cavities with material which was solid at the operating temperatures; in such instances, the process either stopped or reverted to the production of a large proportion of perfluoro compounds and/or cleavage products due to the resulting uneven distribution of feed. This problem was particularly acute when the electrodes were submerged to a depth of more than about 6 inches in the electrolyte.

The invasion problem could not be solved by simply using carbons of lower porosity with smaller pores because these tended to bubble feed into the electrolyte at these greater immersion depths. Such "tight" carbons were also more subject to frequent polarization (anode effect) than "loose carbons." Polarization is an incompletely understood phenomenon wherein the resistance of the cell suddenly rises and the cell simply stops operating.

SUMMARY OF THE INVENTION

It is an object of this invention to provide an improved process and apparatus wherein the reaction in an electrochemical conversion process using a porous electrode element is carried out within the confines of the electrode element; it is a further object of this invention to prevent invasion of feed distribution channels in an electrochemical conversion electrode element; it is yet a further object of this invention to provide for uniform distribution of feed through a porous electrode element during long periods of continuous operation; it is a still further object of this invention to provide even distribution of feed material in a relatively large electrode element suitable for commercial scale use.

In accordance with this invention, the lower portion of a porous electrode element containing feed distribution channels and/or ports is impregnated with a surfactant having a fluorocarbon radical; this electrode element is used in electrochemical fluorination reactions in which the reaction takes place within the confines of the porous electrode element.

BRIEF DESCRIPTION OF THE DRAWINGS

In the drawings, forming a part hereof, wherein like reference characters denote like parts in the various views, FIG. 1 is a schematic representation of an electrochemical cell arrangement utilizing a treated porous electrode element in accordance with this invention;

FIG. 2 is a schematic representation of another treated porous electrode in accordance with this invention;

FIG. 3 is a cross section along section lines 3—3 of FIG. 2; and

DESCRIPTION OF THE PREFERRED EMBODIMENTS

Figure 4:
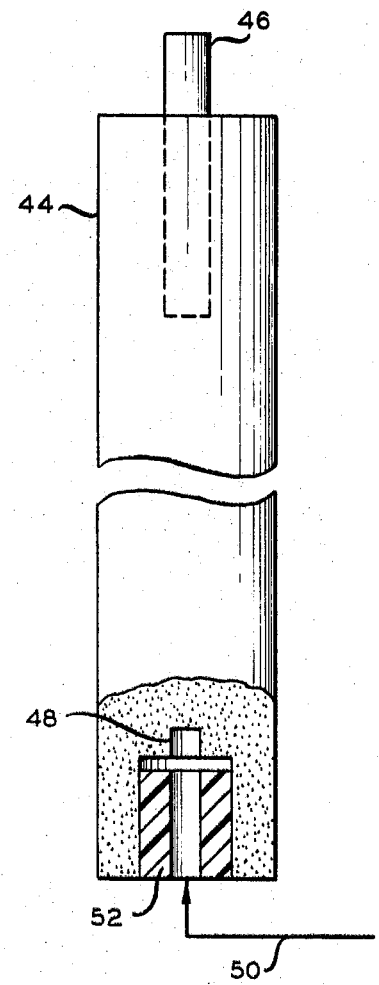
FIG. 4 is a side view partly in section of a cylindrical electrode element in accordance with this invention.

The surfactant having a fluorocarbon radical suitable for use in the instant invention can be represented by the following formula: $CF_3(CX_2)_n-Y$, wherein each X is selected from the group consisting of chlorine, fluorine bromide, and hydrogen, preferably fluorine, $n$ is an integer from 2–20 inclusive, preferably from 6–10, and Y is selected from the group consisting of

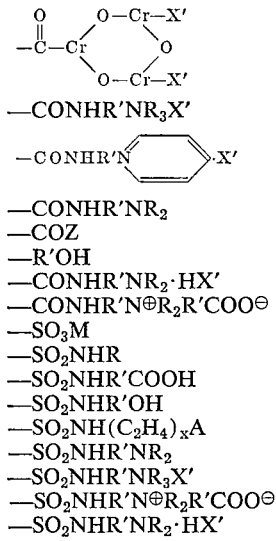

—CONHR′NR$_3$X′

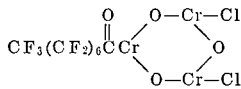

—CONHR′NR$_2$
—COZ
—R′OH
—CONHR′NR$_2$·HX′
—CONHR′N$^{\oplus}$R$_2$R′COO$^{\ominus}$
—SO$_3$M
—SO$_2$NHR
—SO$_2$NHR′COOH
—SO$_2$NHR′OH
—SO$_2$NH(C$_2$H$_4$)$_x$A
—SO$_2$NHR′NR$_2$
—SO$_2$NHR′NR$_3$X′
—SO$_2$NHR′N$^{\oplus}$R$_2$R′COO$^{\ominus}$
—SO$_2$NHR′NR$_2$·HX′ wherein R is an alkyl group having from 1 to about 10 carbon atoms; R′ is a linear alkylene group having from 1 to about 4 carbon atoms; X′ is chlorine, bromine, or iodine; Z is —OH, —OM, or a —OR group; M is a Group I-A metal; and A is hydrogen or a —P(OH)$_2$, or —SO$_3$H radical.

Some examples of suitable fluorocarbon radical-containing surfactants which are suitable for use in the present invention are:

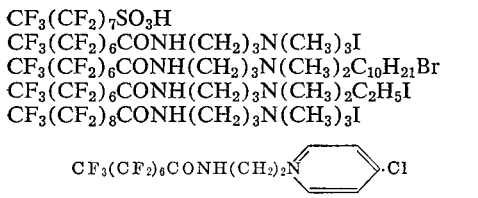

CF$_3$(CF$_2$)$_7$SO$_3$H
CF$_3$(CF$_2$)$_6$CONH(CH$_2$)$_3$N(CH$_3$)$_3$I
CF$_3$(CF$_2$)$_6$CONH(CH$_2$)$_3$N(CH$_3$)$_2$C$_{10}$H$_{21}$Br
CF$_3$(CF$_2$)$_6$CONH(CH$_2$)$_3$N(CH$_3$)$_2$C$_2$H$_5$I
CF$_3$(CF$_2$)$_8$CONH(CH$_2$)$_3$N(CH$_3$)$_3$I

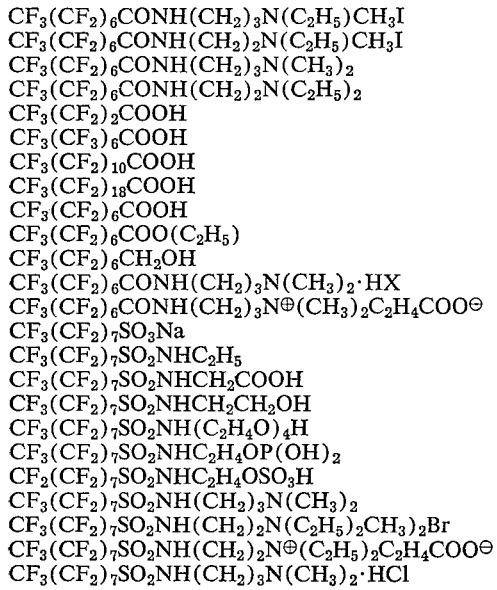

CF$_3$(CF$_2$)$_6$CONH(CH$_2$)$_2$N(C$_2$H$_5$)CH$_3$I
CF$_3$(CF$_2$)$_6$CONH(CH$_2$)$_2$N(C$_2$H$_5$)CH$_3$I
CF$_3$(CF$_2$)$_6$CONH(CH$_2$)$_3$N(CH$_3$)$_2$
CF$_3$(CF$_2$)$_6$CONH(CH$_2$)$_2$N(C$_2$H$_5$)$_2$
CF$_3$(CF$_2$)$_2$COOH
CF$_3$(CF$_3$)$_6$COOH
CF$_3$(CF$_2$)$_{10}$COOH
CF$_3$(CF$_2$)$_{18}$COOH
CF$_3$(CF$_2$)$_6$COOH
CF$_3$(CF$_2$)$_6$COO(C$_2$H$_5$)
CF$_3$(CF$_2$)$_6$CH$_2$OH
CF$_3$(CF$_2$)$_6$CONH(CH$_2$)$_3$N(CH$_3$)$_2$·HX
CF$_3$(CF$_2$)$_6$CONH(CH$_2$)$_3$N$^{\oplus}$(CH$_3$)$_2$C$_2$H$_4$COO$^{\ominus}$
CF$_3$(CF$_2$)$_7$SO$_3$Na
CF$_3$(CF$_2$)$_7$SO$_2$NHC$_2$H$_5$
CF$_3$(CF$_2$)$_7$SO$_2$NHCH$_2$COOH
CF$_3$(CF$_2$)$_7$SO$_2$NHCH$_2$CH$_2$OH
CF$_3$(CF$_2$)$_7$SO$_2$NH(C$_2$H$_4$O)$_4$H
CF$_3$(CF$_2$)$_7$SO$_2$NHC$_2$H$_4$OP(OH)$_2$
CF$_2$(CF$_2$)$_7$SO$_2$NHC$_2$H$_4$OSO$_3$H
CF$_3$(CF$_2$)$_7$SO$_2$NH(CH$_2$)$_3$N(CH$_3$)$_2$
CF$_3$(CF$_2$)$_7$SO$_2$NH(CH$_2$)$_2$N(C$_2$H$_5$)$_2$CH$_3$)$_2$Br
CF$_3$(CF$_2$)$_7$SO$_2$NH(CH$_2$)$_2$N$^{\oplus}$(C$_2$H$_5$)$_2$C$_2$H$_4$COO$^{\ominus}$
CF$_3$(CF$_2$)$_7$SO$_2$NH(CH$_2$)$_3$N(CH$_3$)$_2$·HCl and the like and mixtures thereof.

The fluorocarbon radical-containing surfactants described above are known materials and are generally commercially available or can be prepared by conventional methods. A convenient method of preparation of some of the preferred surfactants is by reacting perfluorooctanoyl fluoride, prepared by the electrochemical fluorination of octanoic acid, with suitable inorganic bases, amines, alcohols, glycols, and the like. A particularly effective surfactant can be prepared by the reaction of perfluoro octanoyl fluoride with reagents such as Cr(OCl)$_3$, CrCl$_3$, CrCl(OCl)$_2$, or CrO$_2$Cl$_2$.

The impregnation of the porous electrodes with the surfactant of the present invention can be carried out by conventional means. In general, the surfactant is contacted with the electrode as a dispersion in an inert and generally volatile liquid medium. For example, the surfactant can be dissolved in a solvent such as isopropyl alcohol, or a less soluble surfactant can be suspended, in a finely divided state, in an inert diluent such as pentane. In some cases where the surfactant is already a liquid, a dispersant need not be used. The temperature of contact is not critical and can be carried out under any temperature at which the contacting medium is fluid and below its decomposition point, room temperature generally being satisfactory.

After contacting the electrode with the surfactant for a sufficient time to substantially saturate the electrode, the electrode is allowed to drain. It is then subjected to temperatures in the range of from about 70 to about 270° F. which are sufficient to remove the volatile components and to otherwise dry the treated electrode. The amount of surfactant deposited on the electrode can vary over a wide range. In general, a suitable amount will be enough so as to decrease the wettability of the electrode and yet not so great that excessive plugging of the pores will result. Typically, a satisfactory amount of surfactant is deposited on the electrode by a single impregnation using a solution containing about 1 to 60, preferably about 20 to 40, weight percent of the surfactant. A single treatment is presently believed adequate for the life of the electrode, but the treatment can be repeated, as desired, after the electrode has been in service for a substantial period.

Relative to the total height of the electrode element, the portion impregnated will generally be the lower $\frac{1}{50}$ to $\frac{1}{2}$, preferably the lower $\frac{1}{25}$ to $\frac{1}{7}$, of the electrode element, the impregnated part containing the feed introduction means in the form of ports and/or distribution passageways. The passageways can be formed either before or after the impregnation operation.

The amount of impregnant can vary widely depending on the particular impregnant, electrode element, and electrolyte composition, but will generally be within the range of 0.05 to 10, preferably 0.25 to 2.5, grams per cubic inch of the electrode element being impregnated. The lower portion of an integral electrode element can be dipped in the impregnating composition, which is preferred, or the electrode element can be made up of two parts cemented together with a porous cement, the lower part of which has been impregnated. In the preferred embodiment, it is apparent that there will be an area where the amount of impregnant gradually is reduced at the interfaces of the two areas due to a wicking action. The range of 0.05 to 10 grams per cubic inch is computed for the portion of the electrode actually submerged and discounts the portion above the interface. This gives an effective electrolyte invasion-inhibiting amount of said surfactant in the submerged portion.

The porous element of the electrode assemblies of the invention can be fabricated from any suitable conducting, porous, electrolyte resistant material which is compatible with the system and which is not wetted by the electrolyte. By "not wetted" is meant that the contact angle between the electrolyte and the electrode must exceed 90° in order that anticapillary forces will prevent substantial invasion of the small pores of the porous element by the electrolyte. Porous carbon, which is economical and readily available in ordinary channels of commerce, is presently preferred for said porous element. In many instances it is advantageous to provide a metal electrode element in contact with a porous carbon electrode element. For instance a porous carbon anode can have a nickel screen wrapped around it. The electrodes of the invention can be fabricated in any suitable shape or design, but must be arranged or provided with a suitable means for introducing the feed reactant material into the pores of the porous element thereof.

The electrode assemblies of the invention can be employed in any convenient cell configuration or electrode arrangement. The only requirements are that the cell body and the electrodes in the cell be fabricated of materials which are resistant to the action of the contents of the cell under the reaction conditions. Materials such as steel, iron, nickel, polytetrafluoroethylene (Teflon), carbon, and the like, can be employed for the cell body. The cathode can be fabricated in any suitable shape or design and can be made of any suitable conducting material such as iron, steel, nickel, alloys of said metals, and carbon. For example, a cathode can be fabricated from a metal screen or gauze, a perforated plate, and can have a shape complementary to the shape of the porous anode.

The electrode assemblies of the invention can be employed in a wide variety of electrochemical fluorination processes utilizing a porous electrode and an HF-containing electrolyte which does not wet the porous electrode and wherein the reaction takes place within the confines of the pores of the porous anode.

By preventing invasion and blocking of the feed introduction and distribution passages, the treatment of the instant invention allows operating with larger pore size carbon electrode elements which undergo polarization (anode effect) less frequently. Thus, not only does this invention allow more uniform distribution of feed materials with its concomitant reduction in undesired by-products, reduced anode pressure, and freedom from plugging of feed distribution passageways, but the invention also provides operation which is inherently less susceptible to frequent interruptions due to polarization because of the ability to utilize carbon electrode elements of larger pore size.

As referred to hereinabove, the instant invention is applicable to electrochemical fluorination reactions as disclosed and claimed in a copending application wherein a current-conducting, essentially anhydrous liquid hydrogen fluoride electrolyte is electrolyzed in an electrolysis cell provided with a cathode and a porous anode (preferably porous carbon). A fluorinatable organic compound is introduced into the pores of said anode, and at least a portion of said organic compound is at least partially fluorinated within the pores of said anode. Fluorinated products are recovered from said cell. The present invention provides improved electrode assemblies which are especially suited to be employed as anodes in the process of said copending application to produce partially fluorinated materials and/or to fluorinate organic compounds with little or no scission of carbon to carbon bonds.

Very few organic compounds are resistant to fluorination. Consequently, a wide variety of feed materials, both normally liquid and normally gaseous compounds, can be used as feedstocks in this process. Organic compounds which are normally gaseous or which can be introduced in gaseous state into the pores of a porous anode under the conditions employed in the electrolysis cell, and which are capable of reacting with fluorine, are presently preferred as starting materials. However, starting materials which are introduced into the pores of the anode in liquid state can also be used. Generally speaking, desirable organic starting materials which can be used are those containing from 1 to 8, preferably 1 to 6, carbon atoms per molecule. However, reactants which contain more than 8 carbon atoms can also be used. If desired, suitable feed materials having boiling points above cell operating temperatures can be passed into the pores of the porous anode in gaseous state by utilizing a suitable carrier gas. Thus, a suitable carrier gas can be saturated with the feed reactant (as by bubbling said carrier gas through the liquid reactant), and then passing the saturated carrier gas into the pores of the porous anode. Suitable carrier gases include the inert gases such as helium, argon, krypton, neon, xenon, nitrogen, etc. Normally gaseous materials such as hydrocarbons containing from 1 to 4 carbon atoms can also be used as carrier gases. These latter gases will react, but in many instances this will not be objectionable. The above-described carrier gases, and particularly said inert gases, can also be used as diluents for the feedstocks which are normally gaseous at cell operating conditions.

Some general types of starting materials which can be used include, among others, the following: alkanes, alkenes, alkynes, amines, ethers, esters, mercaptans, nitriles, alcohols, aromatic compounds, and partially halogenated compounds of both the aliphatic and aromatic series. It will be understood that the above-named types of compounds can be either straight chain, branched chain, or cyclic compounds. Partially chlorinated and the partially fluorinated compounds are the preferred partially halogenated compounds. The presently preferred starting materials are the saturated and unsaturated hydrocarbons (alkanes, alkenes, and alkynes) containing from 1 to 6 carbon atoms per molecule. The presently more preferred starting materials are the normally gaseous organic compounds, and particularly said saturated and unsaturated hydrocarbons, containing from 1 to 4 carbon atoms per molecule.

Since fluorine is so reactive, no list of practical length could include all starting materials which can be used. However, representative examples of the above-described starting materials include, among others, the following: methane; ethane; propane; butane; isobutane; pentane; n-hexane; n-octane; cyclopropane; cyclopentane; cyclohexane; cyclooctane; 1,2-dichloroethane; 1-fluoro-2-chloro-3-methylheptane; ethylene; propylene; cyclobutene; cyclohexene; 2-methylpentene-1; 2,3-dimethylhexene-2; butadiene; vinyl chloride; 3-fluoropropylene; acetylene; methylacetylene; vinylacetylene; 3,3-dimethylpentyne-2; allyl chloride; methylamine; ethylamine; diethylamine; 2-amino-3-ethylpentane; 3-bromopropylamine; triethylamine; dimethyl ether; diethyl ether; methylethyl ether; methylvinyl ether; 2-iodoethylmethyl ether; di-n-propyl ether; methyl formate; methyl acetate; ethyl butyrate; ethyl formate; n-amyl acetate; methyl 2-chloroacetate; methyl mercaptan; ethyl mercaptan; n-propyl mercaptan; 2-mercaptohexane; 2-methyl-3-mercaptoheptane; acetonitrile; propionitrile; n-butyronitrile; acrylonitrile; n-hexanonitrile; methanol; ethanol; isopropanol; n-hexanol; 2,2-dimethylhexanol-3; n-butanol; ethylenebromohydrin; benzene; toluene; cumene; o-xylene; p-xylene; and monochlorobenzene.

In addition to such fluorinatable organic materials described above, carbon monoxide and oxygen can be used as feedstocks to produce carbonyl fluoride and oxygen difluoride, respectively.

The electrochemical fluorination process is carried out in a medium of hydrogen fluoride electrolyte. Although said hydrogen fluoride electrolyte can contain small amounts of water, such as up to about 5 weight percent, it is preferred that said electrolyte be essentially anhydrous. The hydrogen fluoride electrolyte is consumed in the reaction and must be either continuously or intermittently placed in the cell.

Pure anhydrous liquid hydrogen fluoride is nonconductive. The essentially anhydrous liquid hydrogen fluorides described above have a low conductivity which, generally speaking, is lower than desired for practical operation. To provide adequate conductivity in the electrolyte, and to reduce the hydrogen fluoride vapor pressure at cell operating conditions, an inorganic additive can be incorporated in the electrolyte. Examples of suitable additives are inorganic compounds which are soluble in liquid hydrogen fluoride and provide effective electrolytic conductivity. The presently preferred additives are the alkali metal (sodium, potassium, lithium, rubidium, and cesium) fluorides and ammonium fluoride. Other additives which can be employed are sulphuric acid and phosphoric acid. Potassium fluoride, cesium fluoride, and rubidium fluoride are the presently preferred additives. Potassium fluoride is the presently most preferred additive. Said additives can be utilized in any suitable molar ratio of additive to hydrogen fluoride within the range of from 1:4.5 to 1:1, preferably 1:4 to 1:2. The presently most preferred electrolytes are those which correspond approximately to the formula $KF \cdot 2HF$, $KF \cdot 3HF$, or $KF \cdot 4HF$. Such electrolytes can be conveniently prepared by adding the required quantity of hydrogen fluoride to $KF \cdot HF$ (potassium bifluoride). In general, said additives are not consumed in the process and can be used indefinitely. Said additives are frequently referred to as conductivity additives for convenience.

The electrochemical fluorination can be effectively and conveniently carried out over a broad range of temperatures and pressures limited only by the freezing point and the vapor pressure of the electrolyte. Generally speaking, the fluorination process can be carried out at temperatures within the range of from minus 80 to 500° C. at which the vapor pressure of the electrolyte is not excessive, e.g., less than 250 mm. Hg. It is preferred to operate at temperatures such that the vapor pressure of the electrolyte is less than about 50 mm. Hg. As will be understood by those skilled in the art, the vapor pressure of the electrolyte at a given temperature will be dependent upon the composition of said electrolyte. It is well known that additives such as potassium fluoride cause the vapor pressure of liquid hydrogen fluoride to be decreased an unusually great amount. A presently preferred range of temperature is from about 60 to about 105° C. Higher temperatures sometimes tend to promote fragmentation of the product molecules.

Pressures substantially above or below atmospheric can be employed if desired, depending upon the vapor pressure of the electrolyte as discussed above. In all instances, the cell pressure will be sufficient to maintain the electrolyte in liquid phase. Generally speaking, the process is conveniently carried out at substantially atmospheric pressure. It should be pointed out that a valuable feature of the process is that the operating conditions of temperature and pressure within the limitations discussed above are not critical and are essentially independent of the type of feed employed in the process.

For purposes of efficiency and economy, the rate of direct current flow through the cell is maintained at a rate which will give the highest practical current densities for the electrodes employed. Generally speaking, the current density will be high enough so that anodes of moderate size can be employed, yet low enough so that the anode is not corroded or disintegrated under the given current flow. Current densities within the range of from 30 to 1000, or more, preferably 50 to 500 milliamps per square centimeter of anode geometric surface area can be used. Current densities less than 30 milliamps per square centimeter of anode geometric surface area are not practical because the rate of fluorination is too slow. The voltage which is employed will vary depending upon the particular cell configuration employed and the current density employed. In all cases, under normal operating conditions, however, the cell voltage or potential will be less than that required to evolve or generate free or elemental fluorine. Voltages in the range of from 4 to 12 volts are typical. The maximum voltage will not exceed 20 volts per unit cell. Thus, as a guide, voltages in the range of 4 to 20 volts per unit cell can be used.

As used herein, unless otherwise specified, the term "anode geometric surface" refers to the outer geometric surface area of the porous carbon element of the anode which is exposed to electrolyte and does not include the pore surfaces of said porous element.

The feed rate of the fluorinatable material being introduced into the pores of the porous carbon element of the anode is an important process variable in that, for a given current flow or current density, the feed rate controls the degree of conversion. Similarly, for a given feed rate, the amount of current flow or current density can be employed to control the degree of conversion. Gaseous feed rates which can be employed will preferably be in the range of from 0.5 to 10, milliliters per minute per square centimeter of anode geometric surface area. With the higher feed rates, higher current density and current rates are employed. Since the anode can have a wide variety of geometrical shapes, which will affect the geometrical surface area, a sometimes more useful way of expressing the feed rate is in terms of anode cross-sectional area (taken perpendicular to the direction of flow). On this basis, for a typical anode the above range would be 25 to 500 milliliters per minute per square centimeter of cross-sectional area.

The actual feed rate employed will depend upon the type of carbon used in fabricating the porous element of the anode as well as several other factors including the nature of the feedstock, the conversion desired, current density, etc., because all these factors are interrelated and a change in one will affect the others. The feed rate will be such that the feedstock is passed into the pores of the anode, and into contact with the fluorinating species therein, at a flow rate such that the inlet pressure of said feedstock into said pores is essentially less than the sum of (a) the hydrostatic pressure of the electrolyte at the level of entry of the feedstock into said pores and (b) the exit pressure of any unreacted feedstock and fluorinated products from said pores into the electrolyte. Said exit pressure is defined as the pressure required to form a bubble on the outer surface of the anode and break said bubble away from said surface. Said exit pressure is independent of hydrostatic pressure. Under these flow rate conditions there is established a pressure balance between the feedstock entering the pores of the anode from one direction and electrolyte attempting to enter the pores from another and opposing direction. This pressure balance provides an important feature in that essentially none of the feed leaves the anode to form bubbles which escape into the main body of the electrolyte. Essentially all of the feedstock and/or reaction product travels within the carbon anode via the pores therein until it reaches a collection zone within the anode from which it is removed via a conduit, or until it exits from the anode at a point above the surface of the electrolyte.

The more permeable carbons will permit higher flow rates than the less permeable carbons. Any suitable porous carbon which will permit operation within the limits of the above-described pressure balance can be employed in fabricating the porous element of the electrode assemblies of this invention. Thus, broadly speaking, porous carbons having a permeability within the range of from 0.5 to 75 darcys and average pore diameters within the range of from 1 to 150 microns can be employed in practicing this invention. Generally speaking, carbons having a permeability within the range of from about 5 to about 75 darcys, preferably 10–70 darcys, and an average pore diameter within the range of from about 40 to about 140, preferably 50–120, microns, will benefit most from the invention.

Similarly, electrode shapes, electrode dimensions, and manner of disposition of the electrode in the electrolyte will also have a bearing on the flow rate. Thus, owing to the many different types of carbon which can be employed and the almost infinite number of combinations of electrode shapes, dimensions, and methods of disposition of the electrode in the electrolyte, there are no really fixed numerical limits on the flow rates which can be used. Broadly speaking, the upper limit on the flow rate will be that at which "breakout" of feedstock and/or fluorinated product begins along the immersed portion of the electrode element. Unless otherwise specified, "breakout" is defined as the formation of bubbles of feedstock and/or fluorinated product on the outer immersed surface of the anode (electrode) with subsequent detachment of said bubbles wherein they pass into the main body of the electrolyte. Broadly speaking, the lower limit of the feed rate will be determined by the requirement to supply the minimum amount of feedstock sufficient to prevent evolution of free fluorine. As a practical guide to those skilled in the art, the gaseous flow rates can be within the range of from 3 to 600, preferably 12 to 240 cc. (STP) per minute per square centimeter of cross-sectional area (taken perpendicular to the direction of flow).

While the feed introduction means is protected from electrolyte invasion by treatment in accordance with the instant invention, there must be some penetration of the pores of at least the outermost portion of the electrode element where the reaction can take place. The above-described pressure balance will permit some migration of electrolyte into the pores of the anode. The amount of said migration will depend upon the inlet pressure of the feedstock but mostly upon the pore size. The larger size pores are mainly responsible for electrolyte invasion of the electrode element channels. It has been found that porous carbon anodes as described herein can be successfully operated when up to 40 to 50 per cent of the pores, of what is primarily the reaction zone, have been filled by liquid HF electrolyte so long as the channels, in what is primarily the feed zone, can be kept clear.

The feed material and the products obtained therefrom are retained in the cell for a period of time which is generally less than one minute. Because the residence time is comparatively short and is especially uniform, the production of the desired products is facilitated. The fluorinated products and the unconverted feed are passed from the cell and then are subjected to conventional separation techniques such as fractionation, solvent extraction, adsorption, and the like, for separation of unconverted feed and reaction products. Unconverted or insufficiently converted feed materials can be recycled to the cell for the production of more highly fluorinated products, if desired. Perfluorinated products, or other products which have been too highly fluorinated, can be burned to recover hydrogen fluoride which can be returned to the cell, if desired. By-product hydrogen, produced at the cathode, can be burned to provide heat energy or can be utilized in hydrogen-consuming processes such as hydrogen, etc.

Referring now to the drawings, particularlly FIG. 1, there is shown in schematic representation a complete electrochemical conversion cell having a porous electrode element 10 having the general shape of a rectangular block. A first passageway 12 extends longitudinally into and substantially across said block adjacent the lower end thereof. The interior wall of said passageway 12 comprises a first surface for the introduction of a feed material from first conduit 14 into the pores of said porous element 10. Depending upon the size and configuration of porous element 10, more than one passageway 12 can be provided. Also, if desired, the feedstock can be introduced into the center of passageway 12 by means of conduit 16. Said porous element 10 is disposed in a cell container 18. The upper end of said porous electrode element is above the level of the electrolyte in said container as depicted by reference character 20. Thus, the upper end surface of porous electrode element 10 comprises a second surface for withdrawing unreacted feedstock and product from the pores of the porous electrode element 10. Conduit 22 compirses a second conduit means for withdrawing product and unreacted feedstock from within the pores of porous electrode element 10. If desired, the space above the electrolyte can be divided by a partition 24 extending from the top of the cell to below the level of the electrolyte to keep the anode products separated from the cathode products; or, a conventional cell divider can be employed to divide the cell into an anode compartment and a cathode compartment. However, such a divider is not essential. A current collector 26 comprising a pair of metal bars extends into the top portion of porous electrode element 10. If desired, a metal insert 28 can be provided in the top portion of electrode element 10 to increase current collection efficiency. A cathode 30, fabricated of any suitable metallic material such as a screen, perforated plate, etc., is disposed in said cell as indicated. Cathode products can be removed via conduit 27.

In FIG. 2, porous electrode element 32 has the general shape of a rectangular block. A first passageway 34 extends longitudinally into and substantially across said block adjacent to the lower end thereof. The surface of said passageway 34 comprises a first surface for introduction of the reactive feedstock into the pores of porous electrode element 32. First conduit 36 extends into said block and into communication with said first passageway 34 at about the midpoint thereof. If desired, the feed conduit can be connected to one end of passageway 34 as indicated. However, it is preferred to plug the open end of passageway 34 and introduce the feedstock at about the midpoint of said passageway by conduit 36. A second passageway 38 extends longitudinally into and substantially across said block adjacent the upper end thereof. Said second passageway comprises a collection lateral and the surface thereof provides a second surface for withdrawing products and unreacted feedstock from within the pores of said porous electrode element 32. Anode effluent conduit 40 is connected into about the midpoint of passageway 38 as shown. If desired, depending upon the size and configuration of porous electrode element 32, more than one pasageway 34 and more than one passageway 38 can be provided. Current collectors 42, comprising metal bars, extend into the upper end of porous electrode element 32. FIG. 3 is a cross section along section lines 3—3 of FIG. 2. The portion of this electrode element which has been treated by impregnation with a surface active agent having a fluorocarbon radical is denoted by reference character A.

Referring now to FIG. 4, there is shown a cylindrical electrode element 44 having a current collector 46 embedded in the upper portion therof. Feed is introduced into cavity 48 in the lower portion of the electrode by means of line 50. The lower portion of cavity 48 is sealed off from the bulk of the electrolyte by Teflon plug 52.

Many conventional items, such as temperature controllers and regulators, conduits, electrical equipment, and the like, have not been included for the sake of simplicity, but such inclusion is understood by those skilled in the art and is within the scope of the invention.

Example

A cylindrical porous carbon anode, 1⅜ inches in diameter and 14 inches long, was connected to a copper current collector at its upper end and was drilled and tapped at its lower end to provide for a fitting and connection for the introduction of fluorinatable feed material. After the bottom fitting had been installed, a small cavity existed about 1 inch from the bottom of the anode. The anode material was a conventional porous carbon material (National Carbon Co. PC–45) which had an effective porosity of about 40 percent, a permeability of about 20 darcys, and an average pore diameter of about 58 microns.

The bottom 1½ inches of the cylindrical porous carbon anode was twice impregnated with a 30 percent isopropanol solution of $CF_3(CF_2)_6COCr_2O_3Cl_2$ (FC–805, a commercial paper sizing material manufactured by Minnesota Mining and Manufacturing Co.). Each impregnation was followed by drying of the anode at 200° F. A total of about 6.5 grams of solids was deposited on the anode in this manner.

The treated anode was then installed at an immersion depth of about 12 inches, into a mild steel electrolytic cell which contained a circular mild steel screen cathode which surrounded the carbon anode. The electrolyte was KF·2HF containing about 0.5 wt. percent of LiF.

The above-described cell containing the treated porous carbon anode was used continuously for electrochemical fluorination of ethylene dichloride (EDC) to fluorinated products such as dichlorofluoroethanes which are valuable precursors to the polymerizable tetrafluoroethylene. The conditions of the conversion included an electrolyte temperature of about 90° C., a current density of about 179 ma./cm.$^2$, and an operating voltage at about 7-9 volts. The HF was continuously replenished. The table below shows the essential data and operating conditions on about the ninth day of operation.

EDC conversion—40.6%
EDC rate—110 ml./hr.
Faradays/hr.—2.24
Faradays/mole—1.60
Moles product/hr.—0.568
By-products (mono and/or trichloro)—9.8 mole percent In general, the cell and anode operated smoothly for thirteen days at which time it was shut down and the anode was removed for inspection. The porous carbon anode, treated by the method of the present invention, was found to be in good condition and the feed port cavity was found completely clear of electrolyte. During the thirteen-day period, the anode pressure varied from about 2 to about 6 p.s.i.g.

As a control, an electrochemical conversion cell identical to that of Example I except that the porous anode was not treated in the lower portion thereof was employed for an identical conversion reaction. Within less than a day the anode pressure exceeded 10 p.s.i.g. In another control run using apparatus identical to that of the first control run, the anode plugged up cutting off the flow of feed material in less than one day. In both control runs excessively large quantities of overly fluorinated and cracked materials were produced.

The anode pressure is the pressure of the fluid feed required to pass through the above-described system at the specified rate.

While this invention has been described in detail for the purpose of illustration, it is not to be construed as limited thereby but is intended to cover all changes and modifications within the spirit and scope thereof.

I claim:

1. A process for the electrochemical fluorination of a fluorinatable organic compound feedstock, which process comprises: passing an electric current through a current-conducting, essentially anhydrous, liquid hydrogen fluoride electrolyte composition contained in an electrolysis cell provided with a cathode and a porous anode wherein the lower 1/50 to 1/2 of said porous anode is impregnated with an effective electrolyte invasion inhibiting amount of a surfactant represented by the following generic formula: $CF_3(CX_2)_n$—Y, wherein X is selected from the group consisting of chlorine, fluorine, bromine, and hydrogen, $n$ is an integer from 2–20 inclusive, and Y is selected from the group consisting of

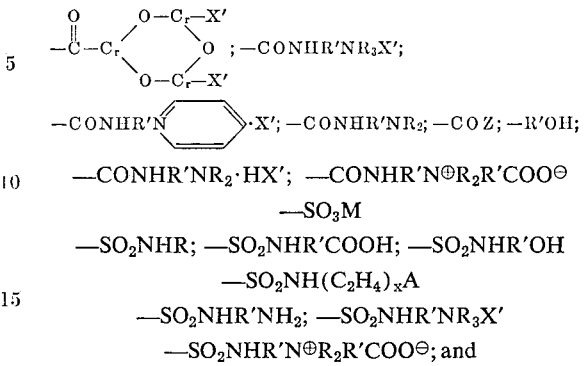

—CONHR′NR$_2$·HX′;  —CONHR′N⊕R$_2$R′COO⊖

—SO$_3$M

—SO$_2$NHR;  —SO$_2$NHR′COOH;  —SO$_2$NHR′OH

—SO$_2$NH(C$_2$H$_4$)$_x$A

—SO$_2$NHR′NH$_2$;  —SO$_2$NHR′NR$_3$X′

—SO$_2$NHR′N⊕R$_2$R′COO⊖; and

—SO$_2$NHR′NR$_2$·HX′ wherein R is an alkyl group having from 1 to about 10 carbon atoms; R′ is a linear alkylene group having from 1 to about 4 carbon atoms; X′ is chlorine, bromine, or iodine; Z is —OH, —OM, or a —OR group; M is a Group I-A metal; and A is hydrogen or a —P(OH)$_2$, or —SO$_3$H radical; passing said feedstock into the pores of said anode within said impregnated area and therein at least partially fluorinating at least a portion of said feedstock; passing fluorinated product and any remaining unfluorinated feedstock from within the pores of said anode at a point spaced apart from the point where said feedstock was passed into said pores of said anode; and recovering fluorinated product from an effluent stream from said cell.

2. A method according to claim 1 wherein said porous anode is comprised of carbon and wherein said feed is passed through feed distribution passageways within said impregnated portion.

3. A method according to claim 1 wherein said porous anode is comprised of carbon, wherein said surfactant is $CF_3(CF_2)_6COCr_3O_3Cl_2$, and wherein said surfactant is present in said lower portion of said anode in an amount within the range of 0.05 to 10 grams per cubic inch of volume of said lower portion of said porous anode.

4. A method according to claim 3 wherein said feed is passed through feed distribution passageways within said impregnated portion of said porous anode and wherein said surfactant is present in said lower portion of said porous anode in an amount within the range of 0.05 to 10 grams per cubic inch.

References Cited

UNITED STATES PATENTS

| | | | |
|---|---|---|---|
| 2,592,144 | 4/1952 | Howell et al. | 204—247X |
| 3,280,014 | 10/1966 | Kordesch et al. | 204—74X |
| 3,461,050 | 8/1969 | Childs | 204—59 |

JOHN H. MACK, Primary Examiner

N. A. KAPLAN, Assistant Examiner

U.S. Cl. X.R.

204—246, 277, 283, 294